UNITED STATES PATENT OFFICE.

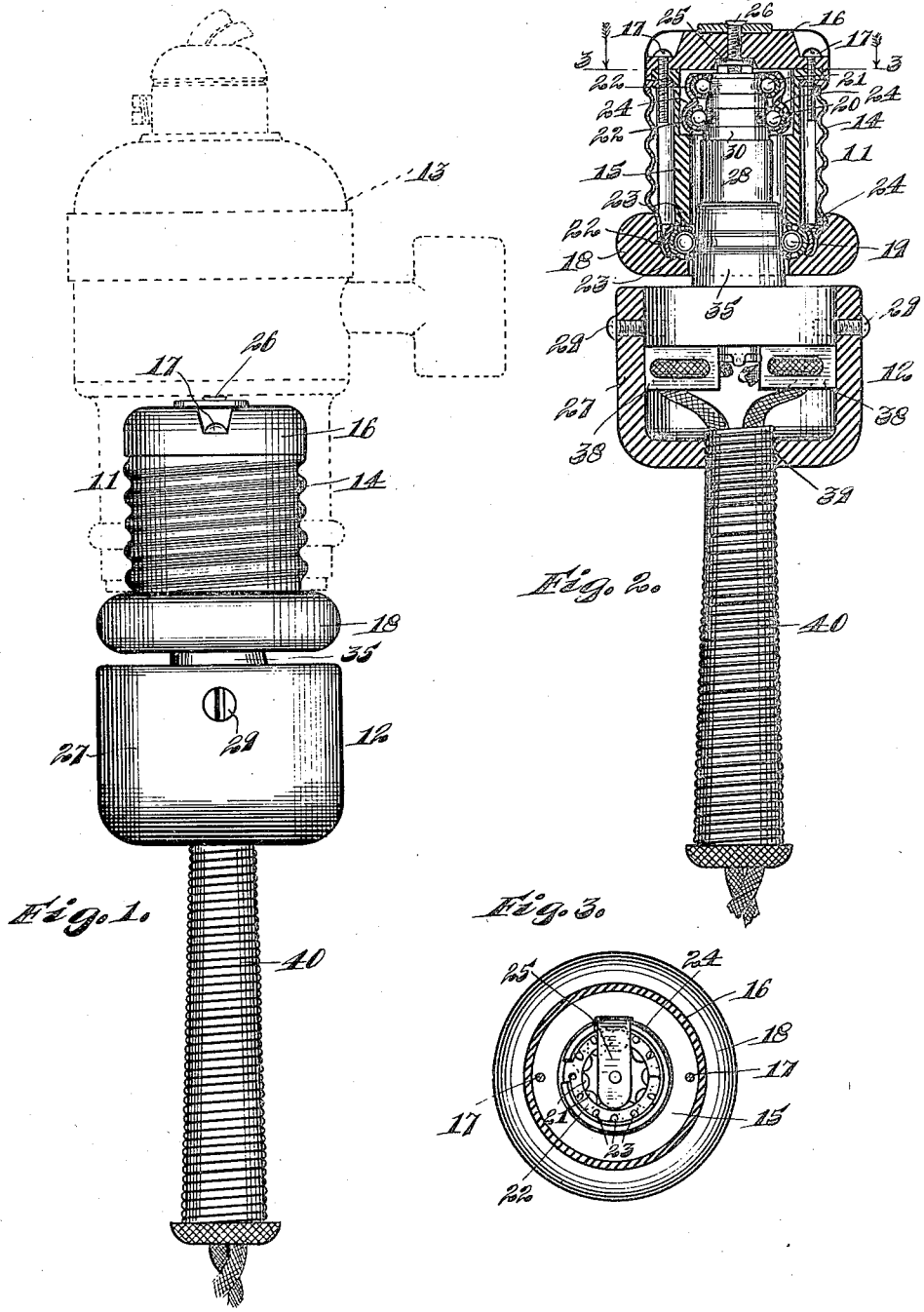

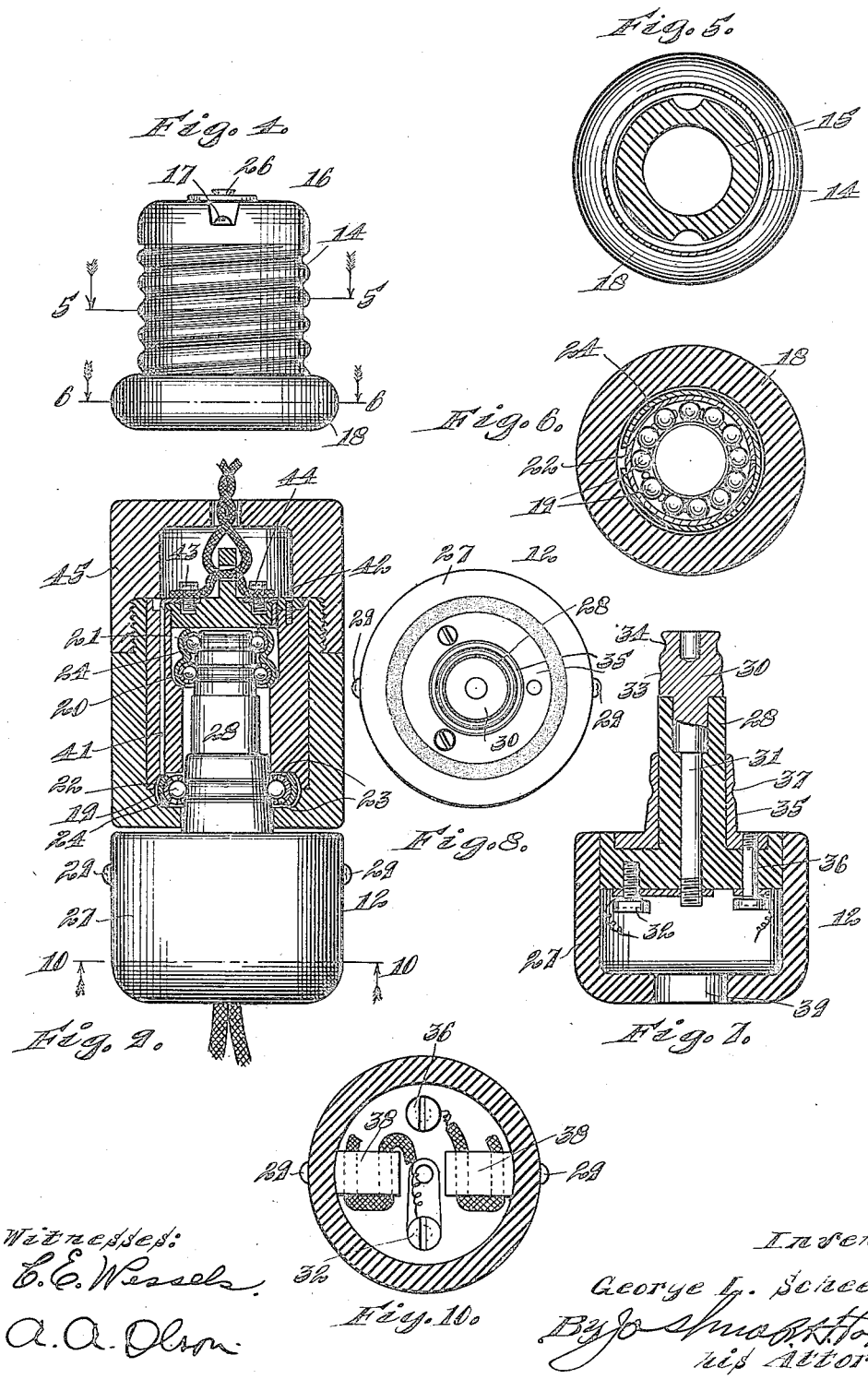

GEORGE L. SCHEEL, OF CHICAGO, ILLINOIS.

CONNECTING DEVICE FOR ELECTRICAL CONDUCTORS.

1,324,278.

Specification of Letters Patent.  Patented Dec. 9, 1919.

Application filed April 11, 1916.  Serial No. 90,362.

*To all whom it may concern:*

Be it known that I, GEORGE L. SCHEEL, a citizen of the United States, and a resident of the city of Chicago, county of Cook, and State of Illinois, have invented certain new and useful Improvements in Connecting Devices for Electrical Conductors, of which the following is a specification.

My invention relates to improvements in connecting devices for electrical conductors, and has for its object the production of a device of this character whereby an electrical connection may be established between two elements which will permit of free rotary movement of the same, and which, at the same time, will permit of ready disconnection of the elements when desired.

A further object is the production of a connection, as mentioned, which will be of simple construction and efficient in use.

Other objects will appear hereinafter.

With these objects in view, the invention consists in the combinations and arrangements of parts hereinafter described and claimed.

The invention will be best understood by reference to the accompanying drawings forming a part of this specification, and in which, Figure 1 is a side elevation of a connecting device embodying the invention, showing the same in combination with the conventional electric lamp socket, which is shown in dotted lines, Fig. 2 is a central section of the device shown in Fig. 1, Fig. 3 is a section taken on line 3—3 of Fig. 2, Fig. 4 is a side elevation of the female member of the connection separately, Figs. 5 and 6 are sections taken on lines 5—5 and 6—6 respectively of Fig. 4, Fig. 7 is a central section of the male member of the connection, Fig. 8 is a top plan view of Fig. 7, Fig. 9 is a sectional view illustrating a form of the connector designed for use where a connection is desired between conductor wires, and Fig. 10 is a section taken on line 10—10 of Fig. 9.

The connecting device comprises female and male members 11 and 12 respectively, said female member, in the form shown in Figs. 1 to 4 inclusive, which form is designed for use particularly in connection with the conventional electric lamp socket, such as is shown at 13 in Fig. 1, consisting of an outer metallic casing 14 which is formed with external screw-threads for engagement with the threads of socket 13. Within the member 14 is provided a lining 15 of insulating material and at one end of said member 14 is provided a disk or cap 16 of insulating material, the parts 14, 15 and 16 being connected together by screws 17. At the opposite or mouth end of the member 14 is provided a ring 18 also of insulating material. A circular socket is thus formed in the female member at the mouth of which is provided a series of balls 19 which are arranged in circular formation in the member 18. Similarly arranged in the bottom of the socket of member 11 are two series of balls 20 and 21 which are also arranged in circular formation. Each of said series of balls is mounted in a holder 22 which is in the form of an annular resilient split channel of metal, the same being adapted to extend just slightly past the center of the balls in order to hold the same in position in the holder, the balls being, of course, permitted free movement in the holder. In order to allow for ready insertion of the balls in the holder, the opposite sides of the latter are formed with spaced slots 23, said slots of course increasing the resiliency of the sides of the holder so as to facilitate insertion of the balls, as will be readily understood. In order to hold the split or joint in each holder normally closed, so as to avoid any interference with the free movement of the balls, each of the holders is embraced with an annular resilient channel 24, the resistance of the latter being greater than that of the holder embraced thereby, so that normally the holder will be compressed and thus the split or joint therein normally held closed. The members 24 coöperating with the series of balls 20 and 21 are preferably formed integral inasmuch as these two series coöperate to form one terminal, as will be understood as the description proceeds. The member 24 coöperating with the balls 20 and 21 is provided with an inwardly extending lip 25, as clearly shown in Fig. 3, with which engages an exteriorly projecting screw 26 arranged centrally in the end member 16, said screw being adapted to engage with the central contact of the socket 13, as will be readily understood. The threaded member 14 of the female member is in constant engagement with the member 24 coöperating with the balls 19, so that, when the female member is in engagement with a conventional socket as 13, the balls 19 will be electrically connected through the medium of the member 14 with the threaded terminal of the socket, and the balls 20 and 21 will be electrically connected through the medium of screw 26 with the other terminal of the socket.

The male member 12 of the device consists of a cup-shaped body 27 of insulating material from one end of which projects a cylindrical projection 28 of insulating material, the rearward enlarged end of the member 28 being secured to the member 27 by screws 29, as clearly shown in Fig. 2. Provided at the outer end of the projection 28 is an end piece 30, of conducting material, said end piece having a shank 31 projecting centrally through the member 28 which is connected at its rearward end with a screw or binding-post 32 contained within the member 27. The end piece 30 is formed with two annular grooves 33 and 34 which are adapted, upon insertion of the projection 28 into the socket of the female member 11, to engage with the series of balls 20 and 21 respectively, as clearly shown in Fig. 2. At the base of the projection 28 is provided a collar 35 of conducting material which is connected with a screw or binding post 36, as clearly shown in Fig. 7. The member 35 is formed with an annular groove 37 which is adapted, upon insertion of the projection of male member 12 into the socket of female member 11, to engage with the series of balls 19. The expansibility of the holders 22 coöperating with the various series of balls of course permits of the insertion and removal of the male member, it being clear that in the inserting operation, the balls must first be spread before the same drop into engagement with the recesses 33, 34 and 37. The circle of the balls 19 is of greater diameter than of the balls 20, and the circle of balls 20 is of greater diameter than of balls 21. With this arrangement, it will be seen, that the projecting portion of the male member will engage simultaneously with all of the balls instead of successively as would otherwise result were the circles of the series of balls all of the same diameter. The circumference of the circle of balls 19 is substantially equal to the combined circumferences of the circles of balls 20 and 21, so that, in use, the balls 19 engaging with the collar 35 of the female member will have the same capacity for conducting current as the balls 20 and 21 engaging with the end piece 30. It is apparent that in the engagement of the male member with the female member, the same are free for relative rotary movement, an electrical connection being at the same time constantly maintained between the binding post or screw 32 of the male member and the contact piece 26 of the female member and between the binding post or screw 36 of the male member and the casing 14 of the female member. The conductor wires are connected, in use, with the screws or binding posts 32 and 36, slotted lugs 38 being preferably provided upon the base of member 28 within the body 27 of the male member for engagement with the conductor wires to relieve the tension and strain upon the members 32 and 36. The member 27 is formed with a central opening 39 for the passage of the conductor wires and a flexible extension conduit 40 may be provided to prevent too sharp bending of the wires at the point of entry of the same into said opening 39.

With the construction set forth then, it will be seen that a construction is provided wherein a pair of conductor wires may be connected with a conventional electric lamp socket in such a manner as to permit of entire freedom of rotary movement for said wires. Also, the construction is such as to permit of instant engagement or disengagement of the wires when desired.

The form shown in Fig. 9 is designed for use where a connection is desired between two sets of conductor wires. In this form of the device, the female member is provided with conductor elements 41 and 42 leading from the balls 19 and 20 and 21 respectively, for connection with screws or binding posts 43 and 44 respectively, which are provided upon the outer or rearward side of the female member. A screw cap 45 may be provided to inclose the connections of the conductor wires with the female member as shown. Except in the changes in minor details of construction as described, this form of the connection is the same as that above set forth, the resulting connection permitting of relative rotary movement of the parts connected and of ready and easy disconnection of the same when desired.

While I have illustrated and described the preferred forms of construction for carrying my invention into effect, these are capable of variation and modification without departing from the spirit of the invention. I, therefore, do not wish to be limited to the precise details of constructions set forth, but desire to avail myself of such variations and modifications as come within the scope of the appended claims.

Having described my invention what I claim as new and desire to secure by Letters Patent is:

1. A connecting device for electrical conductors comprising a pair of male and female connecting members; a series of balls arranged in circular formation carried by one of said members; an expansible holder for said balls; a conductor leading from said balls; means on the other of said members for engagement with said series of balls to lock said members together so as to permit of relative rotary movement thereof; and a conductor leading from said last mentioned means, substantially as described.

2. A connecting device for electrical conductors comprising a pair of male and female connecting members; a series of balls arranged in circular formation carried by one of said members; an expansible holder for said balls, said holder being in the form of a resilient annular split channel; a conductor leading from said balls; means on the other of said members for engagement with said series of balls to lock said members together so as to permit of relative rotary movement thereof; and a conductor leading from said last mentioned means, substantally as described.

3. A connecting device for electrical conductors comprising a pair of male and female connecting members; a series of balls arranged in circular formation carried by one of said members; a resilient split annular holder for said balls; resilient means cooperating with said holder for normally compressing the same to close the split therein; means on the other of said members for engagement with said series of balls to lock said members together so as to permit of relative rotary movement thereof; and a conductor leading from said last mentioned means, substantially as described.

4. A connecting device for electrical conductors comprising a pair of male and female connecting members; a series of balls arranged in circular formation carried by one of said members; a resilient split annular holder for said balls; resilient means embracing said holder for normally compressing the same to close the split therein; means on the other of said members for engagement with said series of balls to lock said members together so as to permit of relative rotary movement thereof; and a conductor leading from said last mentioned means, substantially as described.

5. A connecting device for electrical conductors comprising a pair of male and female connecting members; a series of balls arranged in circular formation carried by one of said members; a resilient split annular holder for said balls; a resilient split annular channel embracing said holder for normally compressing the same to close the split therein; means on the other of said members for engagement with said series of balls to lock said members together so as to permit of relative rotary movement thereof; and a conductor leading from said last mentioned means, substantially as described.

6. A connecting device for electrical conductors comprising a pair of male and female connecting members; a series of balls arranged in circular formation carried by one of said members; a resilient annular channel holder for said balls, said holder being slotted to increase the resiliency of the sides thereof; means on the other of said members for engagement with said series of balls to lock said members together so as to permit of relative rotary movement thereof; and a conductor leading from said last mentioned means, substantially as described.

7. A connecting device for electrical conductors comprising a pair of male and female connecting members; a series of balls arranged in circular formation carried by one of said members; a resilient annular channel holder for said balls, the opposite sides of said holder having spaced slots to increase the resiliency thereof, means on the other of said members for engagement with said series of balls to lock said members together so as to permit of relative rotary movement thereof; and a conductor leading from said last mentioned means, substantially as described.

8. A connecting device for electrical conductors comprising a pair of male and female connecting members; conductor elements on each of said members; a plurality of series of balls arranged in said female member in circular formation and connected with the corresponding conductor elements; an expansible holder for each of said series of balls; means on said male member adapted for engagement with said series of balls of said female member to lock said members together so as to permit of relative rotary movement thereof; and a connection between said last mentioned means and the corresponding conductor elements, substantially as described.

9. A connecting device for electrical conductors comprising a pair of male and female connecting members; conductor elements on each of said members; a plurality of series of balls arranged in said female member in circular formation and connected with the corresponding conductor elements; an expansible holder for each of said series of balls; means on said male member having annular recesses adapted for engagement with said series of balls of said female member to lock said members together so as to permit of relative rotary movement thereof; and a connection between said last mentioned means and the corresponding conductor elements, substantially as described.

10. A connecting device for electrical conductors comprising a pair of male and female connecting members; conductor elements on each of said members; a plurality of series of balls arranged in said female member in circular formation and connected with the corresponding conductor elements; an expansible holder for each of said series of balls; means on said male member having annular enlargements adapted to engage behind said balls to lock said members together so as to permit of relative rotary movement thereof; and a connection between said last mentioned means and the corresponding conductor elements, substantially as described.

11. An electrical connecting device comprising a pair of male and female connecting members, one end of said female member having a recess; a series of balls arranged in said recess in circular formation at the mouth thereof; a plurality of series of balls electrically connected together arranged in said recess in circular formation at the inner end thereof, the diameter of the circle of said first mentioned series of balls being greater than that of the other series of balls; a projection on said male member adapted to enter the recess in said female member; and means on said projection of conducting material adapted to engage with said balls for locking said members together so as to permit of relative rotary movement of said members, substantially as described.

12. An electrical connecting device comprising a pair of male and female connecting members, one end of said female member having a recess; a series of balls arranged in said recess in circular formation at the mouth thereof; a plurality of series of balls electrically connected arranged in said recess in circular formation at the inner end thereof, the circumference of the circle of said first mentioned series of balls being substantially equal to the combined circumferences of the circles of said plurality of series of balls; a projection on said male member adapted to enter the recess in said female member; and means on said projection of conducting material adapted to engage with said balls for locking said members together so as to permit of relative rotary movement thereof, substantially as described.

13. An electrical connecting device comprising a pair of male and female connecting members, one end of said female member having a recess; a series of balls arranged in said recess in circular formation at the mouth thereof; a plurality of series of balls electrically connected arranged in said recess in circular formation at the inner end thereof, the circumference of the circle of said first mentioned series of balls being substantially equal to the combined circumferences of the circles of said plurality of series of balls; a projection on said male member adapted to enter the recess in said female member; means on said projection of conducting material adapted to engage with said balls for locking said members together so as to permit of relative rotary movement thereof; and expansible holders coöperating with said series of balls, substantially as described.

In testimony whereof I have signed my name to this specification in the presence of two subscribing witnesses.

GEORGE L. SCHEEL.

Witnesses:
JOSHUA R. H. POTTS,
CORA F. SCHIEBER.